United States Patent
Dornbusch

(10) Patent No.: US 7,224,302 B2
(45) Date of Patent: May 29, 2007

(54) INTEGRATED PM/FM MODULATOR USING DIRECT DIGITAL FREQUENCY SYNTHESIS AND METHOD THEREFOR

(75) Inventor: Andrew W. Dornbusch, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 11/209,948

(22) Filed: Aug. 23, 2005

(65) Prior Publication Data

US 2007/0046516 A1    Mar. 1, 2007

(51) Int. Cl.
*H03M 3/00* (2006.01)

(52) U.S. Cl. ........................ 341/143; 455/130
(58) Field of Classification Search ............... 341/143, 341/155, 144; 455/91, 130, 118; 375/344, 375/346

See application file for complete search history.

(56) References Cited

U.S. PATENT DOCUMENTS

| | | | | |
|---|---|---|---|---|
| 5,016,259 A | * | 5/1991 | Hershberger | 375/296 |
| 5,130,671 A | * | 7/1992 | Shahriary et al. | 331/16 |
| 5,272,454 A | * | 12/1993 | Ikai et al. | 332/117 |
| 5,399,998 A | * | 3/1995 | Hino | 332/127 |
| 5,469,166 A | * | 11/1995 | Regev | 342/14 |
| 5,682,431 A | * | 10/1997 | Ohnishi et al. | 381/7 |
| 6,778,117 B1 | | 8/2004 | Johnson | 341/144 |
| 6,810,268 B2 | * | 10/2004 | Park et al. | 455/558 |
| 6,924,711 B2 | * | 8/2005 | Liu | 332/159 |
| 2004/0151263 A1 | * | 8/2004 | Samueli et al. | 375/344 |
| 2005/0085194 A1 | * | 4/2005 | Robinson et al. | 455/91 |

OTHER PUBLICATIONS

"Digital Frequency Synthesis Demystified," Bar-Giora Goldberg, no date.

* cited by examiner

*Primary Examiner*—Peguy JeanPierre
(74) *Attorney, Agent, or Firm*—Larson Newman Abel Polansky & White LLP

(57) ABSTRACT

A PM/FM modulator (100) includes an analog-to-digital converter (110) having an input terminal for receiving an analog input signal, and an output terminal, and a direct digital frequency synthesizer (120) having an input terminal coupled to the output terminal of the analog-to-digital converter, and an output terminal for providing a modulated output signal. In one form, an FM stereo modulator (200) includes a digital stereo modulator (210) and a direct digital frequency synthesizer (250). The digital stereo modulator (210) has a first input terminal for receiving a right analog input signal, a second input terminal for receiving a left analog input signal, and an output terminal for providing a digital signal having a stereo spectrum. The direct digital frequency synthesizer (250) has an input terminal coupled to the output terminal of the digital stereo modulator (210), and an output terminal for providing a modulated output signal.

19 Claims, 2 Drawing Sheets

INTEGRATED PM/FM MODULATOR USING DIRECT DIGITAL FREQUENCY SYNTHESIS AND METHOD THEREFOR

TECHNICAL FIELD

The present invention relates generally to radio systems, and more particularly to modulators for use in frequency modulation (FM) or phase modulation (PM) systems.

BACKGROUND

Direct digital frequency synthesis is a technique for generating programmable frequency sinusoidal signals. In a direct digital frequency synthesizer (DDFS), an input digital signal is used to indicate, directly or indirectly, the desired output frequency. The DDFS provides an output signal that represents digital values for points along a sine wave. The rate at which these values cycle at the DDFS output determines the frequency of the signal.

For example such a DDFS can be advantageously used in a radio frequency (RF) application, such as an RF-to-IF mixer, as described in U.S. Pat. No. 6,778,117, invented by Richard A. Johnson. According to Nyquist's theorem, the DDFS must be clocked at a rate at least twice as high as the frequency of the signal represented. Since the DDFS provides a digital representation of the output clock signal, rather than the output clock signal itself, there is no mechanism for local oscillator signals to leak or radiate into other circuits, causing unwanted locking or spurs.

Recent advances in low voltage CMOS technology have allowed the generation of clock signals on-chip that are high enough to meet the Nyquist criterion for clocking a DDFS for many applications. What is needed are new ways of using a DDFS in these applications.

BRIEF SUMMARY

In one form the present invention provides a PM/FM modulator including an analog-to-digital converter and a direct digital frequency synthesizer. The analog-to-digital converter has an input terminal for receiving an analog input signal, and an output terminal. The direct digital frequency synthesizer has an input terminal coupled to the output terminal of the analog-to-digital converter, and an output terminal for providing a modulated output signal.

In another form, the present invention provides a modulation method. An analog signal is converted to a digital signal. The digital signal is continuously accumulated to form an accumulated digital signal. Successive values of a sine wave are output in response to the accumulated digital signal.

In yet another form, the present invention provides a stereo FM modulator including a digital stereo modulator and a direct digital frequency synthesizer. The digital stereo modulator has a first input terminal for receiving a right analog input signal, a second input terminal for receiving a left analog input signal, and an output terminal for providing a digital signal having a stereo spectrum. The direct digital frequency synthesizer has an input terminal coupled to the output terminal of the digital stereo modulator, and an output terminal for providing a modulated output signal.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
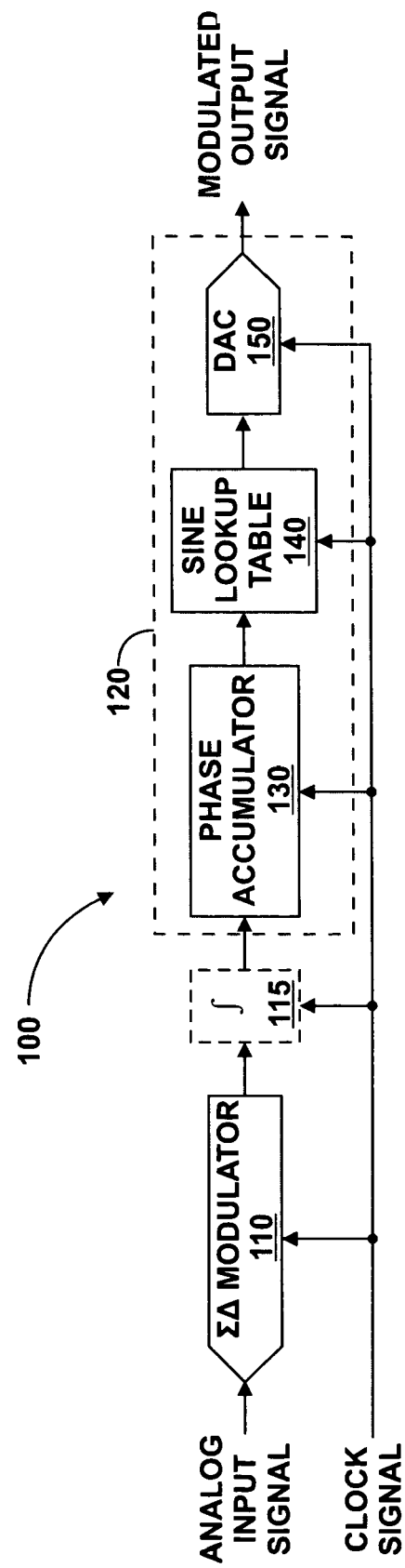
FIG. 1 illustrates in block diagram form a phase modulation (PM)/frequency modulation (FM) modulator according to the present invention.

FIG. 1 illustrates in block diagram form a phase modulation (PM)/frequency modulation (FM) modulator 100 according to the present invention. PM/FM modulator 100 includes an analog-to-digital converter 110 in the form of a sigma-delta modulator and a direct digital frequency synthesizer (DDFS) 120. ΣΔ modulator 110 has a signal input terminal for receiving a signal labeled "ANALOG INPUT SIGNAL", a clock input terminal for receiving a signal labeled "CLOCK SIGNAL", and an output terminal. DDFS 120 has an input terminal coupled to the output terminal of ΣΔ modulator 110, a clock input terminal for receiving the CLOCK SIGNAL, and an output terminal for providing an output signal labeled "MODULATED OUTPUT SIGNAL". As described thus far, PM/FM modulator 100 will operate as a PM modulator. However PM/FM modulator 100 can be modified to operate as an FM modulator by coupling an optional integrator 115, which has a clock input terminal for receiving the CLOCK SIGNAL, between the output terminal of ΣΔ modulator 110 and the input terminal of DDFS 120.

DDFS 120 includes a phase accumulator 130, a sine lookup table 140, and a digital-to-analog converter (DAC) 150. Phase accumulator 130 has an input terminal forming the input terminal of DDFS 120, a clock input terminal for receiving the CLOCK SIGNAL, and an output terminal. Sine lookup table 140 has an input terminal connected to the output terminal of phase accumulator 130, a clock input terminal for receiving the CLOCK SIGNAL, and an output terminal. DAC 150 has an input terminal connected to the output terminal of sine lookup table 140, a clock input terminal for receiving the CLOCK SIGNAL, and an output terminal forming the output terminal of DDFS 120 and providing the MODULATED OUTPUT SIGNAL.

In operation, ΣΔ modulator 110 receives an analog input signal and provides a digital output signal to its output terminal having a pulse density proportional to the analog input signal. As will be explained further with reference to FIG. 3 below, ΣΔ modulator 110 does not have a decimator on its output. In DDFS 120, phase accumulator 130 forms an accumulated digital signal on every clock by accumulating digital pulses from ΣΔ modulator 110 along with the accumulator input value. Sine lookup table 140 outputs samples of a sine wave in response to the accumulated digital signal. Thus, the sine wave output from sine lookup table 140 will have a frequency proportional to the accumulator input value which is phase or frequency modulated by the ANALOG INPUT SIGNAL. DAC 150 then converts this phaseand frequency-variable signal into an analog signal, namely the MODULATED OUTPUT SIGNAL.

More particularly a single higher-frequency CLOCK SIGNAL is used to synchronize the blocks and serve as the master frequency reference. Phase accumulator 130 may be implemented as a simple digital accumulator of N-bit resolution. Frequency is set by adjusting the accumulator input, and can be calculated as $$f_{OUT} = \frac{f_{CLK} * K_{ACCUM}}{2^N} \quad [1]$$

wherein $f_{CLK}$ is the frequency of the INPUT CLOCK, $K_{ACCUM}$ is the accumulator input value, and N is the bit width of phase accumulator 130. The output frequency can be set to anything from 0 to $f_{CLK}$ in $$\frac{f_{CLK}}{2^N}$$

steps, although the Nyquist theorem applies and any frequency over $$\frac{f_{CLK}}{2}$$

will get aliased down.

By dynamically modifying the value of the adder term in DDFS 120, the output waveform frequency can be modified either in the phase domain, or with optional integrator 115, the frequency domain. In known implementations the modulation of the DDFS adder term is done with a digital signal processor (DSP). However PM/FM modulator 100 uses ΣΔ modulator 110 to adjust the value of the adder term to DDFS 120, thus creating the analog MODULATED OUTPUT SIGNAL in response to the ANALOG INPUT SIGNAL. The linearity of PM/FM modulator 100 can be kept extremely high, limited only by the linearity of the analog portions of ΣΔ modulator 110 and DAC 150.

The analog-to-digital converter used in PM/FM modulator 100 can take any of several possible forms, and can optionally include an intermediate digital filter and/or a decimator. Since the CLOCK SIGNAL has a frequency much greater than the output waveform, it is possible to use the output of ΣΔ modulator 110 to modulate phase accumulator 130 directly (by direct connection in a PM system or through integrator 115 in an FM system). Thus PM/FM modulator 100 can be made smaller in size by eliminating the decimator typically found at the output of an oversampled data converter.

The elements of PM/FM modulator 100 are substantially combined onto a single integrated circuit. As used herein, "substantially combined" means at least the active circuit elements, i.e. transistors, for the blocks shown in FIG. 1 are on the same integrated circuit. Passive elements, notably capacitors, may be located off-chip due to their relatively large component values. In one particular embodiment, this integrated circuit is a complementary metal-oxide-semiconductor (CMOS) integrated circuit.

Figure 2:
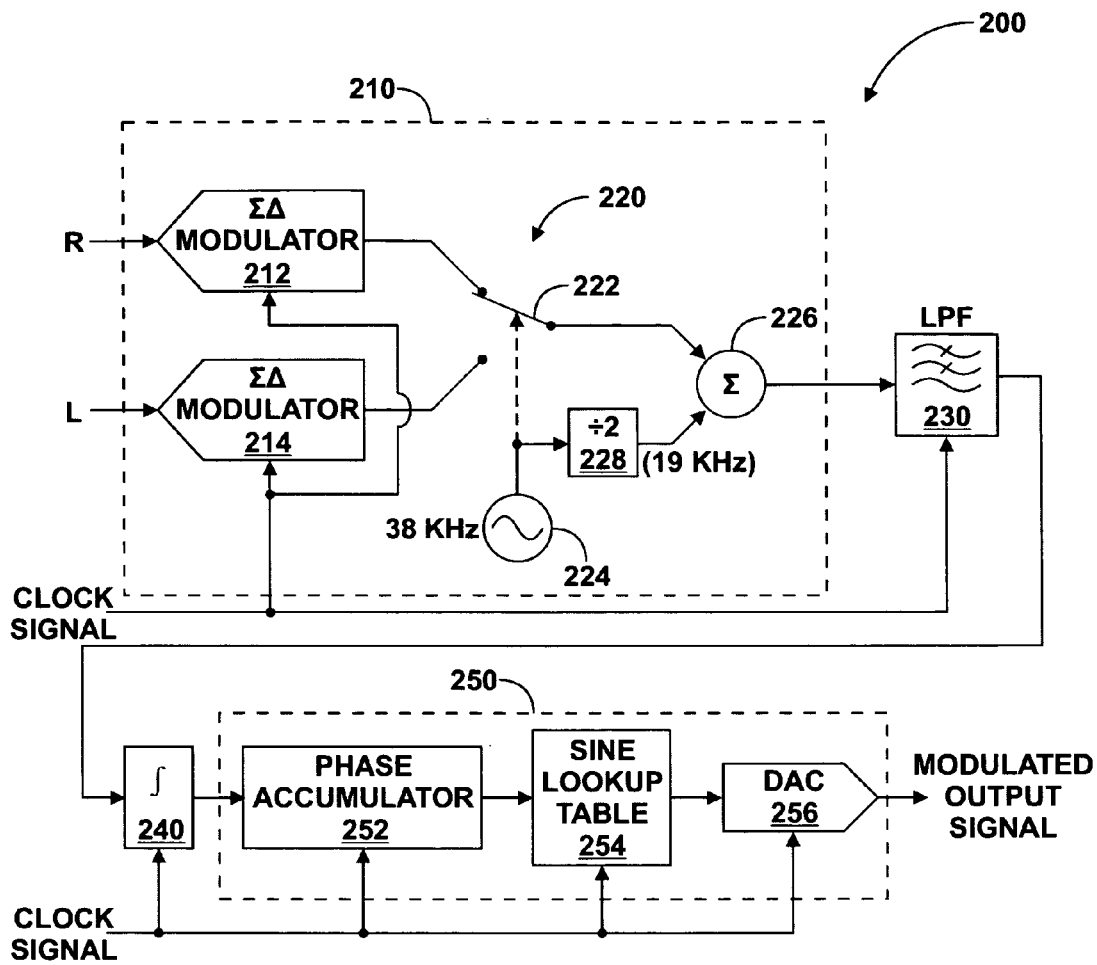
FIG. 2 illustrates in block diagram form a stereo FM modulator according to another aspect of the present invention.

FIG. 2 illustrates in block diagram form a stereo FM modulator 200 according to another aspect of the present invention. Stereo FM modulator 200 includes generally a digital stereo modulator 210, a lowpass filter labeled "LPF" 230, an integrator 240, and a DDFS 250. Digital stereo modulator 210 has a first input terminal for receiving a right analog input signal labeled "R", a second input terminal, for receiving a left analog input signal labeled "L", a clock input terminal for receiving the CLOCK SIGNAL, and an output terminal for providing a digital output signal. Lowpass filter 230 has an input terminal connected to the output terminal of summing device 226, a clock input terminal for receiving the CLOCK SIGNAL, and an output terminal forming the output terminal of stereo modulator 220. Integrator 240 has an input terminal connected to the output terminal of lowpass filter 230, and an output terminal. DDFS 250 has an input terminal connected to the output terminal of integrator 240, a clock input terminal for receiving the CLOCK SIGNAL, and an output terminal for providing the MODULATED OUTPUT SIGNAL.

More specifically, digital stereo modulator 210 includes analog-to-digital converters in the form of sigma-delta (ΣΔ) modulators 212 and 214, and a stereo modulator 220. ΣΔ modulator 212 has an input terminal for receiving the R signal, a clock input terminal for receiving the CLOCK SIGNAL, and an output terminal. ΣΔ modulator 214 has an input terminal for receiving the L signal, a clock input terminal for receiving the CLOCK SIGNAL, and an output terminal. Stereo modulator 220 has input terminals connected to the output terminals of ΣΔ modulators 212 and 214, and an output terminal forming the output terminal of digital stereo modulator 210.

Stereo modulator 220 includes a switch 222, a clock source 224, a summing device 226, and a divider 228. Switch 222 has a first input terminal connected to the output terminal of ΣΔ modulator 212, a second input terminal connected to the output terminal of ΣΔ modulator 214, a control input terminal, and an output terminal. Clock source 224 has an output terminal connected to the control input terminal of switch 222. Summing device 226 has a first input terminal connected to the output terminal of switch 222, a second input terminal, and an output terminal. Divider 228 has an input terminal connected to the output terminal of clock source 224, and an output terminal connected to the second input terminal of summing device 226.

DDFS 250 is constructed similarly to DDFS 120 in FIG. 1 and includes a phase accumulator 252, a sine lookup table 254, and a digital-to-analog converter (DAC) 256. Phase accumulator 252 has an input terminal forming the input terminal of DDFS 250, a clock input terminal for receiving the CLOCK SIGNAL, and an output terminal. Sine lookup table 254 has an input terminal connected to the output terminal of phase accumulator 252, a clock input terminal for receiving the CLOCK SIGNAL, and an output terminal. DAC 256 has an input terminal connected to the output terminal of sine lookup table 254, a clock input terminal for receiving the CLOCK SIGNAL, and an output terminal forming the output terminal of DDFS 250 and providing the MODULATED OUTPUT SIGNAL.

In basic operation, digital stereo modulator 210 receives the right and left channel information and forms a digital stereo signal with a stereo spectrum, having an (L+R) component at baseband and an (L−R) component at 38 kilohertz (kHz). The stereo spectrum is formed by chopping between the R and L signals using a 38 kHz carrier. The 38 kHz signal is used to operate switch 222, chopping the outputs of ΣΔ modulators 212 and 214. This chopped output is summed with half the baseband carrier, which is divided from clock source 224 by divider 228. The result is that the output of digital stereo modulator 210 is a digital pulse stream whose density is proportional to the mixed right and left channel information. A corresponding stereo demodulator at the receiver end can subsequently separate the right and left channel information.

Note that since digital stereo modulator 210 is operating in the digital domain, the 38 kHz and 19 kHz tones must be generated digitally, such as for example by a dedicated, fixed-frequency DDFS.

Figure 3:
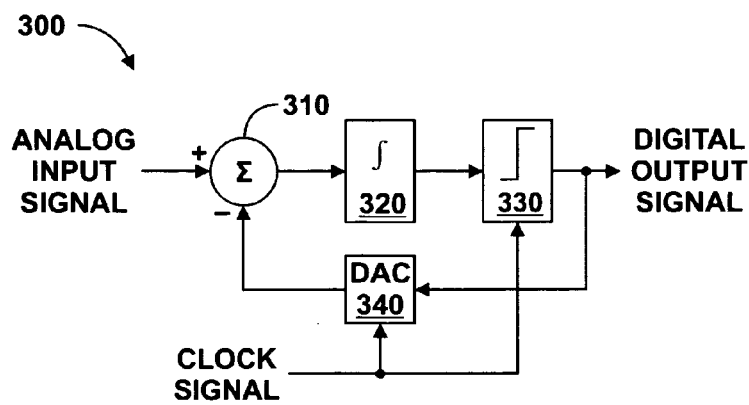
FIG. 3 illustrates in block diagram form a sigma-delta (ΣΔ) modulator 300 that may be used in the PM/FM modulator of FIG. 1 or the stereo audio modulator of FIG. 2.

FIG. 3 illustrates in block diagram form a sigma-delta (ΣΔ) modulator 300 that may be used in PM/FM modulator 100 of FIG. 1 or stereo FM modulator 200 of FIG. 2. ΣΔ modulator 300 includes a summing device 310, an integrator 320, a quantizer 330, and a digital-to-analog converter (DAC) 340. Summing device 310 has a positive input terminal for receiving the ANALOG INPUT SIGNAL, a negative input terminal, and an output terminal. Integrator 320 has an input terminal connected to the output terminal of summing device 310, and an output terminal. Quantizer 330 has an input terminal connected to the output terminal of integrator 320, a clock input terminal for receiving the CLOCK SIGNAL, and an output terminal for providing a signal labeled "DIGITAL OUTPUT SIGNAL". DAC 340 has an input terminal connected to the output terminal of quantizer 330, a clock input terminal for receiving the CLOCK SIGNAL, and an output terminal connected to the negative input terminal of summing device 310.

ΣΔ modulator 300 is a one-bit, lowpass, first-order sigma delta modulator. Thus it has one ΣΔ loop with a single integrator 320 within the modulator loop. Summing device 310 and integrator 320 are continuous-time analog elements. Quantizer 330 is a clocked circuit that resolves the output of integrator 320 to one of two levels corresponding to a logic high level and a logic low level. DAC 340 converts the digital output of quantizer 330 back into an analog voltage to combine with the ANALOG INPUT SIGNAL.

ΣΔ modulator 300 converts the ANALOG INPUT SIGNAL into the DIGITAL OUTPUT SIGNAL having a pulse density proportional to the value of the ANALOG INPUT SIGNAL. ΣΔ modulator 300 also shapes the quantization noise out-of-band so that it can be filtered and removed. Thus ΣΔ modulator 300 provides high resolution and high signal-to-noise ratio, and is easily implemented in CMOS integrated circuits.

Note that the specific architecture of ΣΔ modulator 300 is merely exemplary. In other embodiments, other types of ΣΔ modulators may be used. For example the order of ΣΔ modulator 300 could be increased, or the number of bits provided by quantizer 330 could also be increased beyond one. However one-bit quantizer 330 is especially well-suited for use with a phase accumulator at the input of the DDFS, which also avoids the need for an additional decimator.

Since it is easy to integrate in a low-cost CMOS integrated circuit, a PM/FM modulator as described herein can be implemented cheaply, making it suitable for a variety of applications. For example, the modulator could be an added feature of a portable player implementing the Motion Picture Experts Group standard known as "MP-3" by modulating the decompressed audio output signal onto an FM frequency that can be received by a car stereo The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A frequency modulation (FM) modulator comprising:
    an analog-to-digital converter having an input terminal for receiving an analog input signal, and an output terminal;
    an integrator including an input and an output, wherein said input of said integrator is coupled to said output terminal of said analog-to-digital converter; and
    a direct digital frequency synthesizer having an input terminal coupled to said output of said integrator, and an output terminal for providing a modulated output signal, wherein said modulated output signal is an FM signal.

2. The FM modulator of claim 1, wherein said analog-to-digital converter comprises a sigma-delta modulator.

3. The FM modulator of claim 2, wherein said sigma-delta modulator has an output terminal coupled to said input terminal of said direct digital frequency synthesizer without an intervening decimator.

4. The FM modulator of claim 1, wherein said analog-to-digital converter and said direct digital frequency synthesizer each include a clock input terminal for receiving a common clock signal.

5. The FM modulator of claim 1, wherein said analog-to-digital converter and said direct digital frequency synthesizer are substantially combined onto an integrated circuit.

6. The FM modulator of claim 1, wherein said direct digital frequency synthesizer comprises:
    a phase accumulator having an input terminal for providing said input terminal of said direct digital frequency synthesizer, and an output terminal;
    a sine lookup table having an input terminal coupled to said output terminal of said phase accumulator, and an output terminal; and
    a digital-to-analog converter having an input terminal coupled to said output terminal of said sine lookup table, and an output terminal for providing said modulated output signal.

7. The FM modulator of claim 6, wherein said phase accumulator, said sine lookup table, and said digital-to-analog converter each include a clock input terminal for receiving a common clock signal.

8. A modulation method comprising the steps of:
    converting an analog input signal to a digital signal, wherein said converting comprises providing a digital pulse signal whose pulse density is proportional to said analog input signal and integrating said digital pulse signal to form said digital signal, thereby providing a frequency modulation (FM) signal;
    continuously accumulating said digital signal to form an accumulated digital signal; and
    outputting successive values of a sine wave in response to said accumulated digital signal.

9. The modulation method of claim 8, wherein said step of outputting comprises the steps of:
    outputting digital values of said sine wave in response to said accumulated digital signal; and
    converting said digital values into said FM signal.

10. The modulation method of claim 9, wherein said step of converting comprises the step of converting said analog input signal to said digital signal using an oversampled data converter.

11. The modulation method of claim 10, wherein said step of converting further comprises the step of converting said analog input signal to said digital signal using a sigma-delta modulator.

12. The modulation method of claim 8, further comprising the step of performing said steps of converting, continuously accumulating and outputting in response to a common clock signal.

13. A stereo modulator comprising:
a digital stereo modulator having an output terminal for providing a digital signal having a stereo spectrum, comprising:
  a right channel analog-to-digital converter having an input terminal for receiving a right analog input signal, and an output terminal;
  a left channel analog-to-digital converter having an input terminal for receiving a left analog input signal, and an output terminal;
  a switch having a first input terminal connected to said output terminal of said right channel analog-to-digital converter, a second input terminal coupled to said output terminal of said left channel analog-to-digital converter, a control input terminal for receiving a first clock signal, and an output terminal; and
  a summing device having a first input terminal coupled to said output terminal of said switch, a second input terminal for receiving a second clock signal at a different frequency from said first clock signal, and an output terminal coupled to said output terminal of said digital stereo modulator; and
a direct digital frequency synthesizer having an input terminal coupled to said output terminal of said digital stereo modulator, and an output terminal for providing a modulated output signal.

14. The stereo modulator of claim 13, further comprising:
an integrator coupled between said output terminal of said digital stereo modulator and said input terminal of said direct digital frequency synthesizer.

15. The stereo modulator of claim 13, further comprising:
a lowpass filter having an input terminal coupled to said output terminal of said summing device, and an output terminal coupled to said input terminal of said direct digital frequency synthesizer.

16. The stereo modulator of claim 13, wherein said digital stereo modulator and said direct digital frequency synthesizer are substantially combined onto an integrated circuit.

17. A modulator comprising:
sigma-delta modulator having an input terminal for receiving an analog input signal, and an output terminal for providing a digital output signal having a pulse density proportional to said analog input signal, said sigma-delta modulator providing said digital output signal without using a decimator; and
a direct digital frequency synthesizer having an input terminal coupled to said output terminal of said analog-to-digital converter, and an output terminal for providing a modulated output signal.

18. The modulator of claim 17, wherein said sigma-delta modulator is characterized as having a one-bit quantizer.

19. The modulator of claim 17, wherein said sigma-delta modulator and said direct digital frequency synthesizer each include a clock input terminal for receiving a common clock signal.

* * * * *